Sept. 3, 1957     A. J. L. HUTCHINSON     2,804,941
VAPOR-LIQUID CONTACTING METHOD
Filed Feb. 21, 1956     2 Sheets-Sheet 2
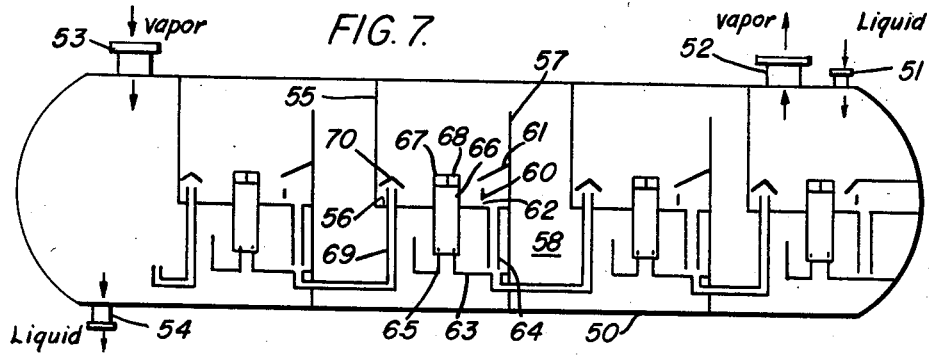
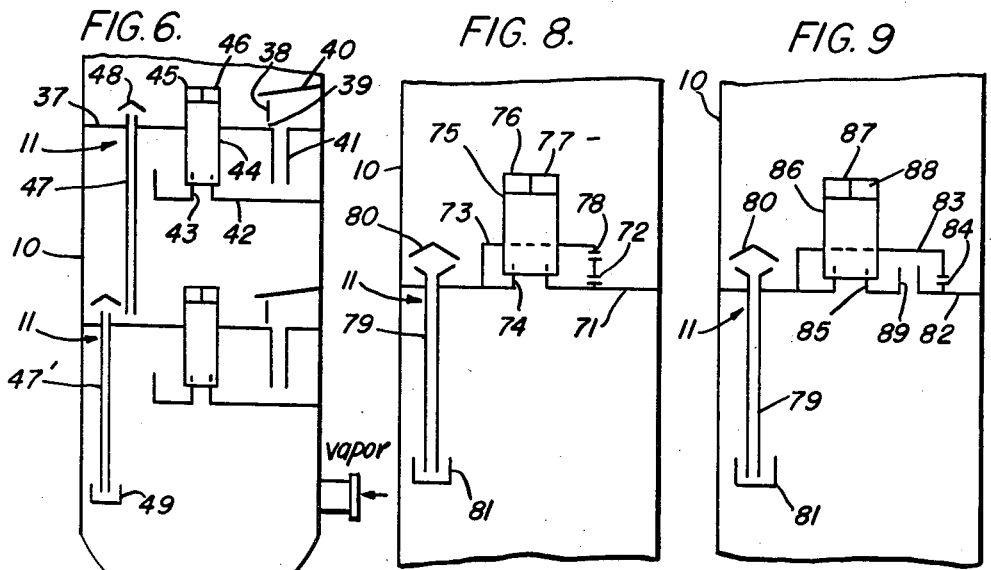
INVENTOR.
ARTHUR J. L. HUTCHINSON
BY
Robert M. McManigal
Attorney

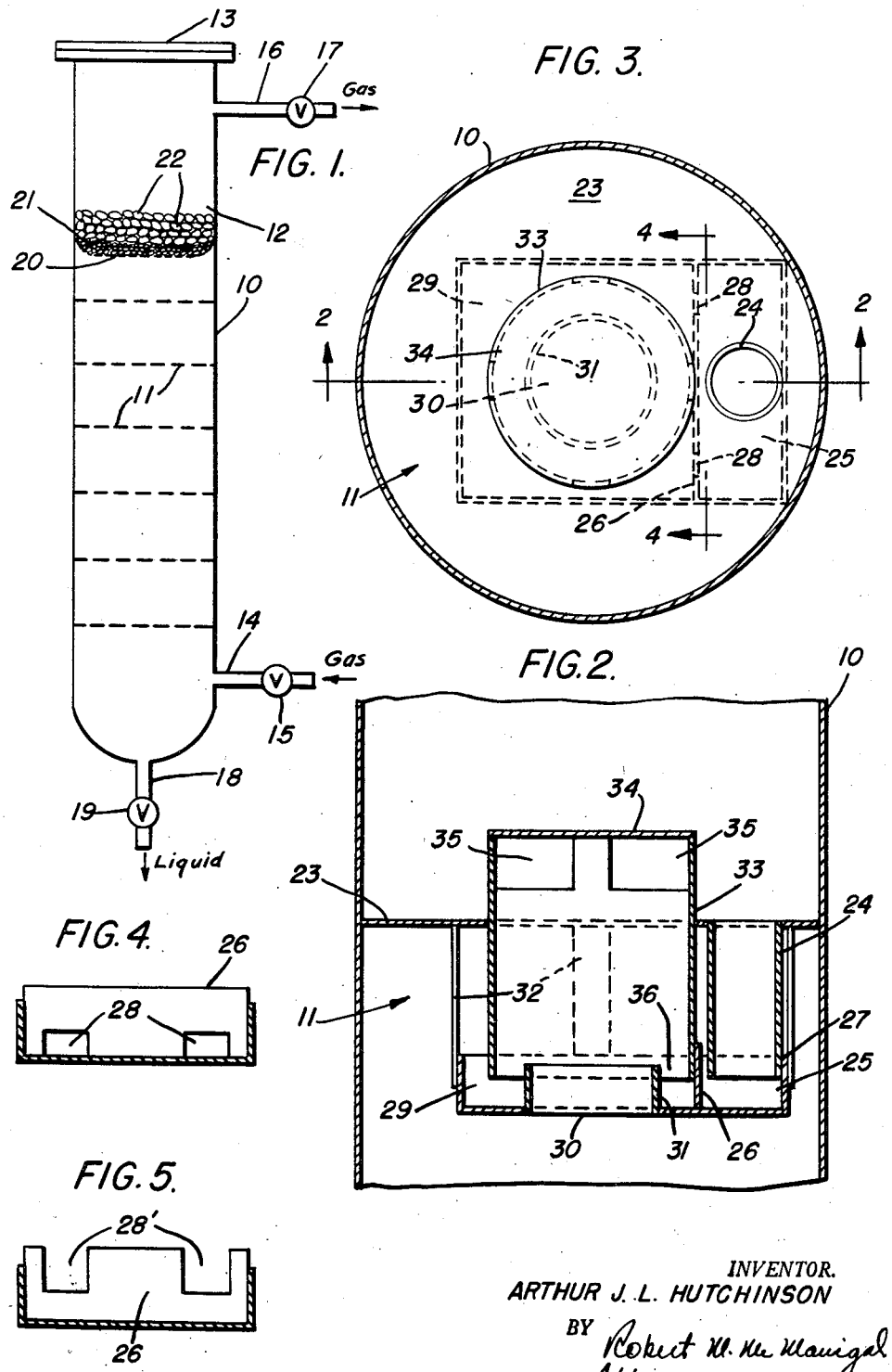

United States Patent Office 2,804,941
Patented Sept. 3, 1957

2,804,941

VAPOR-LIQUID CONTACTING METHOD

Arthur J. L. Hutchinson, Rancho Mirage, Calif.

Application February 21, 1956, Serial No. 567,003

15 Claims. (Cl. 183—121)

This invention relates to a method for contacting vapors or gases with liquids to effect component interchange. More particularly, the invention relates to a method for contacting vapors with liquid wherein the composition of both the gas and the liquid on a given contacting unit are constant over the entire cross-section of the unit and wherein the amount of liquid contacted on a given unit is controlled independently of the rate of vapor flow and independently of the rate of downflow of liquid in a column.

In the interest of simplification, the term "vapor" as used in the specification and appended claims is intended to embrace both gases and gaseous material produced from liquids at their boiling point.

Numerous types of contacting apparatus have been suggested wherein vapors and liquids are flowed in a generally countercurrent manner through a column. In general, these embody a plurality of trays or tray units which are usually spaced vertically from one another, the gas or vapor being introduced at the bottom of a column and taken off at the top, while the liquid is introduced at the top or an intermediate point in the column and is removed from the bottom. In certain types of equipment a film or layer of liquid is formed and a stream of vapor is passed in a direction countercurrent to the flow of the liquid layer so that component interchange occurs at the interface between the liquid layer and the vapor. Other types of equipment employ the familiar bubble caps wherein the upwardly rising vapor contacts liquid flowing more or less horizontally across the tray. Perforated plate columns, likewise employing crossflow of liquid, have been used.

In each of these cases the composition of the liquid and the vapor upon any given tray unit, varies over the cross-section of the tray in the line of liquid travel. In the case of the bubble cap trays and perforated trays, the contacting action is one in which a frothy liquid is formed, namely, bubbles or gas in the liquid.

This is in contrast to the present invention wherein the composition of the liquid and the gas over the cross-section of a given tray element is uniform. Moreover, contact is effected by the present method, at the surfaces of minute droplets of liquid entrained in the vapor. This is important because in order to be entrained in the flowing vapor, the droplets must be exceedingly small and hence provide exceedingly large surfaces at which component interchange can occur. It is known that the rate of component interchange between a liquid and a vapor is a function of the surface area of liquid exposed to the gas. Therefore, by increasing the surface area of the liquid by forming droplets instead of bubbles, the rate of component interchange between liquid and vapor is greatly increased.

Moreover, because of the method of carrying out the present invention a high degree of turbulence in the vapor carrying the entrained liquid particles, is produced in contrast to the almost complete lack of turbulence that occurs within a bubble. Hence the efficiency of component interchange for a given contacting unit is still further increased.

Furthermore, in none of the prior art devices of the character discussed above is there a controlled recirculation of liquid on a given tray or contacting unit, whereby the total liquid subjected to contact with the vapors on such unit may be large in comparison to the amount of liquid that is introduced and removed from said unit.

It has heretofore been proposed to recirculate liquid to trays by means of an external pump. In the present invention controlled recirculation on each tray unit is accomplished without the use of an external liquid pump, the power for said recirculation being furnished solely by means of the energy supplied by the flowing vapor and by gravity.

Moreover, recirculation on each unit provides constantly renewed liquid surfaces which further increases interchange efficiency. By virtue of the factors described, a high degree of equilibrium is attained for each contacting unit so that each unit more nearly approaches the efficiency of a theoretical tray. Such an effect cannot be produced with conventional trays, and as a consequence, fewer actual trays or units are required than in conventional devices to effect a comparable result.

Although the method of the present invention has general utility in the field of fractional distillation, gas absorption, selective solvent extraction and the like, it has particular utility in operations wherein the downflow rate of liquid is small compared to the rate of vapor upflow, as will be seen more fully hereinafter. Moreover, this method is particularly adapted to contacting of vapors with liquids at temperatures which may be only slightly above the freezing point of the liquid phase.

In a broad embodiment the invention comprises a method for vapor-liquid contacting in a component interchange system which comprises separately introducing liquid and vapor into said system, collecting liquid in a liquid-collecting zone, flowing a predetermined controlled portion of said liquid into a contiguous liquid entraining zone, the amount of said liquid entering said entraining zone being controlled independently of the rate of vapor flow, then passing vapors upwardly through said entraining zone at a velocity sufficient to entrain said liquid, passing vapor and entrained liquid into a disengaging zone above said collecting zone, separating the entrained liquid from the vapor, collecting the separated liquid in said collecting zone, returning a portion of said separated liquid to said entraining zone and removing a portion of said liquid from said system.

In a more specific embodiment the invention comprises a method for vapor-liquid contacting in a component interchange system which comprises separately introducing liquid and vapor into said system, collecting liquid in a liquid-collecting zone, flowing at least a major portion of said liquid into a contiguous liquid entraining zone, passing vapors upwardly through said entraining zone at a velocity sufficient to entrain said liquid, passing vapor and entrained liquid into a disengaging zone above said collecting zone, separating the entrained liquid from the vapor, collecting the separated liquid in said collecting zone, returning at least a major portion of said separated liquid to said entraining zone and removing a minor portion of said liquid from said system.

The invention will be understood and explained in greater detail with reference to the appended drawings.

Figure 1 is an elevation in somewhat diagrammatic form of a vertical column on which the invention may be practiced, showing the relative position of the contacting units. This form of apparatus is particularly adapted to the dehydration of vapors by means of solid calcium chloride and the calcium chloride brine produced therefrom;

Figure 2 is a sectional elevation of a single contacting unit of one embodiment of the invention which may be employed in the column of Figure 1, the view being taken along the lines 2—2 of Figure 3;

Figure 3 is a plan of the contacting element shown in Figure 2;

Figure 4 is a detail view of weir taken along the line 4—4 of Figure 3;

Figure 5 is a view of an alternative weir construction which may be used instead of that shown in Figure 4;

Figure 6 is a diagrammatic sectional elevation of a portion of a vertical tower employing contacting units of modified design by which the method of this invention may be carried out;

Figure 7 is a diagrammatic elevation of a generally horizontal arrangement showing another modification of apparatus by which the method of this invention may be carried out;

Figure 8 is a sectional view of another modification of contacting unit which may be employed to practice the method of this invention;

Figure 9 is another modification of contacting unit;

Figure 10 is still another modification of the contacting unit;

Figure 11 is a view diagrammatically illustrating an alternative riser pipe construction; and Figure 12 is a view diagrammatically illustrating an alternative weir arrangement.

Referring to the drawings, Figure 1 comprises a vertical column 10 in which are disposed a plurality of vertically spaced contacting units 11. These units may comprise any one of the constructions shown in Figures 2, 6, 7, 8, 9 or 10. It will be observed from the usage herein that the term "contacting unit" is used to correspond to the individual trays employed in conventional apparatus. Thus, each of the units 11 may be considered to take the place of a conventional tray such as a bubble cap tray or perforated plate. Extending above the column 10 and communicating with it is a second column or vessel 12 in which lumps, granules, pellets or the like of solid calcium chloride, magnesium chloride, lithium chloride, or other deliquescent solids may be disposed. This may be introduced from time to time as required through a cover 13. A gas inlet line 14 having a control valve 15 is provided near the base of the column. A gas outlet line 16 provided with valve 17 is provided at the upper part of the vessel 12. A liquid outlet line 18 having valve 19 is provided at the bottom of the column for withdrawing liquid.

In the operation, which normally employs vapors or gases at pressures above 100 pounds and usually well above 150 pounds per square inch, vapor is introduced through line 14 and passes upwardly through the various contacting units into and through a supporting screen 20 over which may be placed a bed of gravel or coke 21 which serves as a support for the solid deliquescent material 22. Gas passes through this solid bed and moisture contained therein is absorbed by the deliquescent material. The dehydrated gas leaves the column through the line 16 and valve 17. In the course of its passage through the deliquescent material, the latter in the case of calcium chloride becomes hydrated through the various forms of hydrate and eventually becomes dissolved. The saturated solution thus formed travels downwardly to the contacting units 11 wherein it contacts the upwardly rising gas and absorbs more moisture because of its hygroscopic character. The solution becomes more and more diluted as it descends through the column until at the bottom unit has absorbed substantially all the moisture that it can from the inlet gas. The solution is then withdrawn through line 18 and valve 19 and may be discarded, or if desired and if practical, may be regenerated by subjecting it to heat to drive off the absorbed water.

Figure 2 shows a collecting tray 23 upon which the downflowing liquid either from an external source or from an overlying contacting unit, flows. A downcomer 24 is provided, its upper end having a connection with a flush opening in the upper surface of the collecting tray 23. The downcomer extends into a trough 25 wherein liquid collects and forms a seal to prevent vapors from passing upwardly through the downcomer. A weir 26 is provided, this being of greater height than the top 27 of the trough 25. This weir is provided with one or more openings or ports 28, as shown in Figure 4, these being of a predetermined size so as to regulate or control the rate of flow of liquid therethrough. Alternatively, this weir may be of the form shown in Figure 5, wherein the liquid overflows the ports 28'. The shape of the ports is not critical, it being necessary only to furnish liquid passages of predetermined size to control the flow of liquid therethrough.

The liquid flows into a second trough 29 which may be considered as being a part of the entraining zone, in which there is an opening 30. A gas nozzle 31 connects adjacent its lower end with this opening, and has an upper end below the upper edge of the trough 29. The liquid in the trough 29 builds up to a level sufficient to overflow the upper end of the gas nozzle 31 and is entrained in the form of fine droplets by vapors passing upwardly through the opening 30 and the nozzle 31. The troughs 25 and 29 are suspended from the tray 23 by means of supporting bars 32 or by any other suitable means. A riser pipe 33 of larger diameter than the vapor nozzle 31 is mounted by suitable means and extends through the tray 23. The bottom end of the riser pipe 33 extends below the upper end of the nozzle 31. This riser pipe directs the upwardly flowing vapor and entrained liquid. A cap or cover plate 34 is mounted over the upper end of the riser pipe 33 so as to deflect the upwardly rising vapors and entrained liquid through slots or ports 35 cut in the top end portion of the riser pipe, so that the upwardly rising vapors and liquid are deflected outwardly into the column above the tray 23. Because of the deflecting action and because the velocity of the vapors will decrease after they are passed through the slots into the main body of the column 10, the liquid particles will settle and fall downwardly into the collecting tray 23 and are thence returned through the downcomer 24 into the trough 25 and are thus recycled. The area in which settling and liquid separation occurs may be termed a separating zone.

Because of the restricted cross-sectional area of the ports 28 or 28' the flow of liquid from the trough 25 into trough 29 is limited and there will be a build-up of liquid level in trough 25. By increasing or decreasing the cross-sectional area of the ports, the amount of liquid which is recycled by the unit can be increased or decreased, but the rate of recycle will be independent both of the rate of gas flow through the nozzle 31 and the rate of flow of liquid on to tray 23.

In the event the differential pressure between the gas over the liquid in trough 29 outside of gas riser 33 and the pressure inside the riser 33 exceeds the seal of riser pipe 33 in the trough 29 the vapors will pass under the lower edge of the riser pipe and thence through the annular space 36 and into the vapor passage. As the vapor passes through this annular space 36, it will entrain liquid from the trough 29 and carry it into the vapor passage. During this time vapors will be passing at a relatively high velocity through the opening 30 but no liquid will be passing into the gas nozzle. The streams of vapor passing through the annular space 36 and through the nozzle 31 will combine in the vapor passage with the result that the entrained liquid particles will be broken down still further into finer particles, with the net result that there is efficient contacting between the vapor and the entrained particles, thereby producing improved component interchange. It will thus be seen that the contacting unit has a high degree of flexibility with respect to vapor capacity. At the same time, it will be seen that the pressure drop through the contacting unit will be very low and in fact this is usually from approximately one-half to one inch of water per tray unit as compared to two to three inches of water pressure drop in a conventional bubble cap or perforated tray.

Figure 1 shows six contacting units, but it is to be understood that more or less of these could be used as desired. In some types of service, a single contacting unit may suffice. It is also evident that as many units as might be desired can be placed at each level in columns of large diameter. In other words, a single vapor-liquid contacting "unit" may comprise more than one of the individual units described herein.

In Figure 6 is illustrated a modification of the contacting unit which may be employed in this invention. This view shows two superimposed contacting units. A liquid collecting tray 37 is provided and may be attached to the walls of the column 10 in any suitable manner. A weir 38 with restricted ports 39 is provided on this tray in order to hold a level of liquid thereon. A baffle 40 overlies the weir and is attached to the wall of vessel 10 so as to deflect descending coalesced liquid into the pool on tray 37. The liquid passing the weir flows through a downcomer 41 into a trough 42 forming an underlying collecting zone. The downcomer extends beneath the surface of the liquid therein so as to form a seal. The liquid flows over a vapor nozzle 43 wherein it is entrained by upwardly rising vapors and is passed through a riser pipe 44 which is provided with a cap plate 45, and in which there are ports or openings 46. The gas and entrained liquid, as was described in connection with the device of Figure 2, is deflected and the liquid is separated and collected on tray 37. When the liquid level builds up on tray 37 because of the limited flow through the port 39 it overflows downcomer 47 to the next underlying tray. A shield 48 is placed above the downcomer 47 to prevent liquid droplets from falling into the open upper end of the downcomer. The downcomer 47 extends below the surface of the liquid on the next underlying tray in order to form a seal and prevent passage of gas upwardly therethrough. The downcomer 47' on the lowermost contacting element in the column is provided with a seal cup 49 so that gas will not bypass the contacting element.

In Figure 7 is illustrated another modification which may be used in the practice of this invention. In this case the contacting units are mounted in a substantially horizontal tube 50 which is provided with a liquid inlet 51, a vapor outlet 52, a vapor inlet 53 and liquid outlet 54. Bulkheads 55 which terminate in a tray 56 are provided. An upriser 57 cooperates with an adjacent bulkhead 55 to define a vapor passage 58 through which the vapors must pass from one contacting unit to the next. Weir 60 is provided with a shield 61 and ports 62 which permit the controlled flow of liquid from the tray 56 to an underlying tray 63 through downcomer 64. Tray 63 is provided with a vapor nozzle 65 and a riser 66 having a cover plate 67 and vapor outlet ports 68. Downflow pipe 69, having a shield 70, is provided so that as the liquid level builds up the liquid overflows and is conducted to the next downstream tray 63.

Figure 8 shows still another type of apparatus that may be used in practicing this invention. A tray 71 is mounted within the column 10. Liquid collects on this tray and passes through a restricted opening 72 in the walls of a chamber 73. A vapor nozzle 74 is provided in an opening in tray 71. A riser pipe 75 forms a vapor passage. The riser is provided with a cover plate 76 and the ports or slots 77 in the manner previously described. A vent 78 is provided at a point above the liquid level within the chamber 73.

A downflow pipe 79, having a shield 80, leads into a seal cup 81. When the level of liquid on the tray 71 builds up, the liquid will overflow the downflow pipe and from thence to the underlying tray. The seal cup 81 is necessary only in the lowermost tray since otherwise the downpipe would be extended to a point below the surface of the liquid on tray 71.

Figure 9 shows still another modification. A tray 82 is provided. On this tray is a chamber 83. Liquid collecting on tray 82 passes through a restricted opening 84 into the chamber. Vapors rising upwardly pass through a gas nozzle 85 and through a riser pipe 86 which is provided with a cover plate 87 and the slots or ports 88. An open mouth pipe 89 is provided within the chamber 83 in another opening in the tray 82, this pipe extending to a point above the top of the gas nozzle 85 and consequently above the normal liquid level within chamber 83 to prevent flow of liquid from the chamber to the underlying tray. If the gas velocity exceeds that which can be handled by nozzle 85, the vapors will pass through the pipe 89 and, breaking the liquid seal, will pass between the nozzle 85 and the riser pipe 86 and thence through the riser pipe. As was described in connection with Figure 2, this will result in a mixing of the liquid droplets entrained by the latter with vapors passing through the vapor nozzle.

Referring now to Figure 10, a modified arrangement is shown which includes a tray 90 in each collecting unit, and a downcomer 91 forming a connection with an underlying trough 92. The trough 92 communicates with trough 93 by means of a control weir 94. In this construction a nozzle 95 is associated with riser pipe 96 in a similar manner to the previously described arrangements, and the riser pipe 96 has a cover plate 97 and slots or ports 98 for deflecting the rising vapor and entrained liquid. This modification differs primarily in that an overflow downpipe 99 connects at its upper end with the trough 92 of one unit and at its lower end has a sealed connection with trough 93 of an underlying unit. The downpipe 99 as thus arranged maintains the desired liquid level in trough 92 and further acts to change the composition of the liquid entrained by the nozzle 95 of the unit associated with the lower end of downpipe 99.

To illustrate the advantage of this method, it will be discussed in connection with the dehydration of natural gas by means of calcium chloride. When the apparatus of Figure 1 is employed using the contacting device shown in Figures 2 and 3, a bed of solid anhydrous calcium chloride in the form of pellets, granules or lumps is placed in the upper part of the column, being supported upon a suitable screen. The moist gas is passed upwardly through the bed and as water is removed the calcium chloride is gradually converted into a liquid brine which drops downwardly into the liquid collecting zone of the first contacting unit. The amount of liquid which forms depends upon the operating temperature and pressure, since this will determine the maximum capacity of the gas for water-vapor. For example, under typical operating conditions of 500 p. s. i. g. and 70° F. approximately 0.09 gallon per hour of brine will form at a gas charge rate of one MMSCF. per day when passing through a column having five or more contacting units as described herein. On the other hand, at 150 p. s. i. g. and 60° F. approximately .217 gallon per hour of brine will form at a gas charge rate of one MMSCF. per day, in a similar column.

The operating conditions employed will vary depending upon conditions in the field. Thus, the operating pressures are generally from about 150 p. s. i. g. to 1,000 p. s. i. g. and may run to 2,000 p. s. i. g. or higher, depending upon the underground gas pressure and utilization pressure of the dehydrated gas. The temperatures employed are usually below about 100° F. but above the temperature at which hydrate formation of the gas will occur. Typical operating temperatures are in the neighborhood of 50 to 90° F. Within the range of 150 and 850 p. s. i. g. at temperatures of 60–80° F. calcium chloride consumption will vary from about 4.5 to 28 pounds per MMSCF.

It will thus be seen that the quantity of brine produced is extremely small when compared with the volume of gas being processed. In the past, attempts have been made to utilize the hygroscopic properties of the calcium chloride brine to remove water from the gas, for example, by pumping the brine through packed columns or over bubble tray columns. In most cases the brine or a portion of it was regenerated by removing water therefrom by the use of heat. In view of the fact that many of the gas wells are located in remote areas where unattended gas or oil fired heaters are expensive and hazardous, this leaves much to be desired. Furthermore, in dehydrating gas with brine alone, the maximum dew point depression which can be obtained is about 30 to 35° F. This means that when starting with a 70° wet gas, for example, the resultant dew point would only be about 35 to 40° F., which is too high for most commercial uses.

According to the present method, it is possible to utilize substantially the full hygroscopic properties of the calcium chloride brine produced from the solid anhydrous calcium chloride, without the necessity of regeneration, and to produce a dehydrated gas having a dew point below −40° F. The reason for this is that the amount of brine which is recycled on each contacting tray unit can be controlled independently of the rate of gas flow and independently of the amount of brine which is formed from the solid calcium chloride.

Thus, in a typical installation operating on 70° F., gas at 500 p. s. i. g. and producing about 0.09 gallon per hour of brine per MMSCF. of gas per day, a recycle rate on each tray may suitably be about five gallons per minute. Because of the increase in volume of solution due to water absorption, about 0.22 gallon per hour per MMSCF. per day is removed from the bottom of the column. Under these conditions, the consumption of calcium chloride to produce a gas having about −40° F., dew point is approximately 10½ pounds per MMSCF, of gas treated.

To provide an idea of the small size of equipment required to produce this result, a typical installation will be described. The column 10 is 16 inches in diameter; the gas nozzle 31 is 3 inches in diameter; the gas riser pipe 33 is 4 inches in diameter and opening 28 in the weir 26 is one inch by 1⅜ inches, only one opening being used in this case. Five of the gas contacting units 11 of the form shown in Figure 2, were included in the vapor-liquid contacting section. The size opening just described permitted approximately a five gallon per minute recycle rate on each unit. In this particular installation and for this recycle rate the top of the nozzle 31 was about ½ inch lower than the top of the overflow weir 27. This equipment has a capacity of approximately 3 MMSCF. per day at 500 p. s. i. g.

When handling one MMSCF. of gas per day at 5000 p. s. i. g. and 70° F., it will be observed that the ratio of recycle of brine in the top unit is about 3340 per one part of fresh brine introduced onto the unit. At the bottom, the ratio is about 1330:1.

It will be apparent from the above that the net ratio of the liquid downflow to the gas upflow is exceedingly low, but that the ratio of liquid to gas contacted on each tray unit can be made exceedingly high. In the herein described method, the liquid surface exposed to contact with the gas is enormous in comparison with a regular bubble tray operation. In fact, it would be impossible to operate a dehydration operation of this kind with a conventional bubble tray column or perforated tray column of equal height. The advantage is obtained not only because the downflowing liquid is repeatedly recycled on the same tray, but also because it is repeatedly atomized. In practicing the method of this invention in connection with an operation such as that just described, substantially all of the change in energy, in the vapor nozzle of the upflowing gas, is expended in atomizing the liquid. In this connection, it should be noted that in a system such as that described, the pressure drop per contacting unit is usually not over about one inch, and is generally about one-half to three-fourths inch of water. This, of course, will vary somewhat depending upon the liquid recycle rate and gas rate. In a bubble tray operation, the pressure drop at comparable operating pressures and temperatures would be approximately two to three inches of water per tray. The same would be true with columns using perforated plates.

Furthermore, by the method of this invention a high degree of equilibrium is obtained between the uprising vapor and the downflowing brine on each contacting unit. This result could never be accomplished on the conventional bubble cap or perforated plate trays, particularly when employing the ratios of net liquid-to-gas volumes encountered in the example just described.

The brine solution as it is introduced onto the top contacting unit is close to its freezing point, normally within 2–5° F., thereof. In conventional apparatus, if the temperature at the top tray were to drop several degrees, as it might when the equipment is shut down, the solution will freeze and plug the liquid and gas passages which may result in rupture of the equipment if gas flow is started again without cleaning the equipment or thawing the solution on the trays. However, the present method has the advantage that the gas passage will remain open and free of solids so that no damage to the equipment can occur. If the liquid in the contacting unit should freeze, the equipment will warm up and the brine will melt after gas has been passed through for a short time, and normal operation is quickly resumed.

Referring to Fig. 11, an alternative riser pipe construction is shown in which, under certain conditions, advantageous operation will be obtained by increasing the gas flow velocity through the riser pipe 33' from the trough 25. For example, when in normal operation the gas volume is reduced to the minimum capacity of the unit, the gas velocity through the riser pipe 33' may be insufficient to maintain the liquid entrainment action therein. By maintaining normal diameter at the lower end of the riser pipe 33' and swedging the pipe proper to a smaller diameter, sufficient flow operating area is maintained peripherally of nozzle 31 to permit the proper flow of gas and entrainment of liquid at the higher rates of gas throughput.

In Fig. 12 an alternative weir arrangement is shown in which light and heavy liquids entering the trough 25 from the downcomer 24 may be positively separated, and the heavier liquid recirculated while the lighter liquid overflows to the tray below or to the liquid outlet. It is advantageous and desirable to recirculate the heavier of two immiscible liquids, such as may result from the use of calcium chloride brine for the dehydration of a gas, which could form a lighter liquid such as a hydrocarbon condensate.

The structural arrangement for accomplishing the above includes a separating baffle 100, the lower edge of which is raised above the associated tray bottom and under which the heavy liquid may flow, but which acts as a barrier for the lighter liquid. The lighter liquid and excess heavy liquid may flow over the top of a weir 25' arranged on the upstream side of the baffle 100, while the heavier liquid may flow over the weir 26 into the trough 25, this latter weir being arranged on the downstream side of the baffle 100.

While the operation has been described in detail in connection with a specific use, it is apparent that it can be applied to many other types of operations in which higher downflow rates than those above described are employed. Under these conditions it may be necessary to increase the capacity of the downspouts or overflow means and also to increase the size of the slots or openings in the weir plates to handle the desired rates of recycling on each contacting unit as will be apparent to anyone skilled in the art.

I claim:

1. A method for vapor-liquid contacting in a component interchange unit which comprises separately introducing liquid and vapor into said unit, collecting and maintaining a first relatively quiescent body of liquid in a liquid collecting zone of said unit, flowing a metered portion of said collected liquid into a second body of liquid maintained in a liquid entraining zone of said unit, the amount of liquid thus metered being controlled independently of the rate of vapor flow, entraining liquid from said second body by vapors flowing upwardly through said entraining zone at a velocity sufficient to entrain an amount of liquid substantially the same as the amount of liquid metered to said second body of said liquid, passing the vapor and entrained liquid into a disengaging zone of said unit above said collecting zone, separating the entrained liquid from the vapor, passing the separated liquid to the first body of liquid in said collecting zone, returning to the second body of liquid a metered portion of the thus separated and collected liquid for entrainment as described, and removing a portion of said liquid from said interchange unit.

2. The process of claim 1 wherein a major portion of the liquid from said first body is passed to said second body for entrainment.

3. The method of claim 1 wherein a plurality of immiscible liquids are collected in said first body of liquid in the collecting zone, the collected liquids are separated into lighter and heavier liquids, the lighter liquid is removed from said unit, a metered portion of the collected heavy liquid is passed to said second body of liquid for entrainment as described, and a portion of said heavier liquid is removed from the unit.

4. The process of claim 3 wherein a major portion of said heavier liquid is passed from said first body to said second body of liquid for entrainment.

5. In a method for effecting component interchange in a vapor-liquid contacting system wherein vapor and liquid flow in general countercurrent relation to one another, said system comprising a plurality of serially arranged, spaced trays comprising essentially identical vapor-liquid contacting units, and wherein liquid is introduced at one end of said system and vapor at the other end, and are withdrawn from the system at the end opposite their respective points of introduction, the steps comprising collecting liquid in an upper liquid collecting zone of each of said units, flowing said liquid to a point beneath the surface of a first body of liquid maintained in a lower collecting zone in each of said units, flowing a metered major portion of the collected liquid from said first body into a second body of liquid maintained in an entraining zone in each of said units, the amount of liquid thus metered being independent of the rate of vapor flow, passing vapors upwardly through each of said entraining zones at a velocity sufficient to entrain said liquid, each entraining zone communicating with the upper zone of each of said units, separating the entrained liquid from the vapor in a disengaging zone of each of said units, collecting the separated liquid in the respective upper collecting zones, returning at least a major portion of the separated liquid to said first body of liquid and thence to said second body of liquid in each of said units for entrainment as previously described, flowing a portion of said liquid from said units to the next adjacent downstream unit, flowing the vapor from said units to the next adjacent upstream unit (with respect to direction of liquid flow), and withdrawing from the system vapors and liquid leaving the last unit through which they respectively pass.

6. A method for vapor-liquid contacting in a component interchange unit which comprises separately introducing liquid and vapor into said unit, collecting liquid in a first pool in a liquid collecting zone of said unit, flowing a predetermined metered major portion of said liquid into a second pool of liquid maintained in an entraining zone of said unit, the rate of flow of said liquid from said first pool to said second pool being controlled by means independent of the rate of vapor flow, passing vapors upwardly through said entraining zone at a velocity sufficient to entrain said liquid, passing vapor and entrained liquid through a restricted flow channel in said unit to increase their velocity and thence into a disengaging zone of said unit above said collecting zone, reducing the velocity of the vapors, separating the entrained liquid from the vapor, collecting the separated liquid and passing it to said first pool, returning a metered major portion of said separated liquid to said second pool for entrainment as previously described, and removing a portion of said liquid from said interchange unit.

7. The method of claim 5 wherein said units are in generally horizontally spaced relation to each other and liquid is withdrawn from the upper zone of the first unit and passed to the lower zone of the adjacent downstream unit.

8. The method of claim 5 wherein said units are in generally vertically spaced relation to each other and wherein liquid is withdrawn from the lower zone of an upper unit and passed to the upper zone of a lower unit.

9. The method of claim 5 wherein liquid is withdrawn from the upper zone of an upper unit and is passed to the upper zone of an adjacent underlying unit.

10. The method of claim 5 wherein liquid is withdrawn from the upper zone of one unit and is passed to the lower zone of an adjacent downstream unit.

11. The method of claim 5 wherein liquid is withdrawn from the lower zone of one unit and is passed to the entraining zone of an adjacent downstream unit.

12. A method for vapor-liquid contacting in a component interchange unit which comprises moving a liquid into a first relatively quiescent body of liquid maintained in a liquid collecting zone of said unit, flowing a metered portion of the liquid from said first body into a second body of relatively quiescent liquid maintained in a second collecting zone, flowing a vapor upwardly through a liquid entraining zone of said unit contiguous with said second body, conducting liquid from said second body into contact with said vapor and entraining it by means of the force of the vapor movement, carrying the entrained liquid to a point above the collecting zone, reducing the velocity of movement of the vapor and entrained liquid to separate the liquid therefrom, collecting the separated liquid in said liquid collecting zone, recycling a mixture of separated liquid and collected liquid through said second body and said entraining zone as described and removing a portion of the liquid from the interchange unit, the amount of liquid conducted from said first body to said second body being controlled independently of the rate of vapor flow.

13. A method for vapor-liquid contacting in a component interchange unit which comprises separately introducing liquid and vapor into said unit, collecting liquid in an upper liquid collecting zone of said unit, flowing at least a portion of said liquid to a point beneath the surface of a first body of liquid maintained in a lower collecting zone of said unit, flowing a metered portion of said collected liquid from said first body into a second body of liquid maintained in a liquid entraining zone of said unit, the amount of liquid thus metered being controlled independently of the rate of vapor flow, entraining liquid from said second body by vapors flowing upwardly through said entraining zone at a velocity sufficient to entrain said liquid, passing the vapor and entrained liquid into a disengaging zone of said unit above said collecting zone, separating the entrained liquid from the vapor, passing the separated liquid to the first body of liquid in said collecting zone, returning to the second body of liquid a metered portion of the thus separated and collected liquid for entrainment as described and removing a portion of said liquid from said interchange unit.

14. A method for vapor-liquid contacting in a component interchange unit which comprises separately introducing a liquid and vapor into said unit, collecting a first body of liquid in a liquid collecting zone of said unit, flowing a metered portion of said collected liquid into a second body of liquid maintained in a liquid entraining zone of said unit, the amount of liquid passed from the first body of liquid to the second body of liquid being controlled independently of the rate of vapor flow, entraining liquid from said second body by vapors flowing upwardly through said entraining zone at a velocity sufficient to entrain said liquid, passing the vapor and entrained liquid into a disengaging zone of said unit above said collecting zone, separating the entrained liquid from the vapor, passing the separated liquid to the first body of liquid in said collecting zone, returning to the second body of liquid a metered portion of the thus separated and collected liquid for entrainment as described, and removing a portion of said liquid from said interchange unit, the upwardly flowing vapors being passed vertically through said entraining zone and second stream of vapor being directed downwardly against and across the surface of said liquid in said second body thereby entraining it, the first and second streams of vapor then being combined to form a vertically flowing combined stream whereby the liquid entrained by said second stream is reduced to small liquid particles.

15. A method for vapor-liquid contacting in a component interchange unit which comprises separately introducing a liquid and vapor into said unit, collecting a first body of liquid in a liquid collecting zone of said unit, flowing a metered portion of said collected liquid into a second body of liquid maintained in a liquid entraining zone of said unit, the amount of liquid passed from the first body of liquid to the second body of liquid being controlled independently of the rate of vapor flow, entraining liquid from said second body by vapors flowing upwardly through said entraining zone at a velocity sufficient to entrain said liquid, passing the vapor and entrained liquid into a disengaging zone of said unit above said collecting zone, separating the entrained liquid from the vapor, passing the separated liquid to the first body of liquid in said collecting zone, returning to the second body of liquid a metered portion of the thus separated and collected liquid for entrainment as described, and removing a portion of said liquid from said interchange unit, a major portion of the liquid from the first body being passed to said second body for entrainment and a minor portion being removed from said interchange unit.

References Cited in the file of this patent
UNITED STATES PATENTS

| | | |
|---|---|---|
| 1,741,519 | Huff | Dec. 31, 1929 |
| 1,857,816 | Lichtenthaeler | May 10, 1932 |
| 2,714,940 | Milligan | Aug. 9, 1955 |